US012703195B2

(12) United States Patent
Sakai et al.

(10) Patent No.: US 12,703,195 B2
(45) Date of Patent: Aug. 11, 2026

(54) PRINTER SELECTIVELY EXECUTING ONE OF PLURALITY OF DIFFERENT MODES INCLUDING FIRST AND SECOND PRINTING MODES

(71) Applicant: BROTHER KOGYO KABUSHIKI KAISHA, Nagoya (JP)

(72) Inventors: Yuji Sakai, Kasugai (JP); Guowei Chai, Nagoya (JP); Makoto Ushiro, Ichinomiya (JP); Takuji Sakabe, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 177 days.

(21) Appl. No.: 18/620,048

(22) Filed: Mar. 28, 2024

(65) Prior Publication Data

US 2024/0333023 A1 Oct. 3, 2024

(30) Foreign Application Priority Data

Mar. 30, 2023 (JP) ................................ 2023-054477

(51) Int. Cl.

*B41J 29/60* (2006.01)
*B41J 2/35* (2006.01)
*B41J 3/36* (2006.01)
*H02J 7/00* (2006.01)
*H02J 9/00* (2006.01)
*H02J 50/10* (2016.01)

(52) U.S. Cl.

CPC ................ *B41J 29/60* (2013.01); *B41J 2/35* (2013.01); *B41J 3/36* (2013.01); *H02J 7/855* (2026.01); *H02J 9/005* (2013.01); *H02J 50/10* (2016.02)

(58) Field of Classification Search

CPC ....... B41J 29/60; B41J 2/35; B41J 3/36; B41J 3/4075; H02J 7/855; H02J 9/005; H02J 50/10

See application file for complete search history.

(56) References Cited

U.S. PATENT DOCUMENTS

2014/0245036 A1* 8/2014 Oishi .................... H01M 10/44 713/300
2017/0207660 A1 7/2017 Kato

FOREIGN PATENT DOCUMENTS

JP 2016-128230 A 7/2016
JP 2017-131003 A 7/2017

(Continued)

*Primary Examiner* — Justin Seo
(74) *Attorney, Agent, or Firm* — Kenealy Vaidya LLP

(57) ABSTRACT

A printer includes a first power input, a second power input, a printing engine, and a controller. The first power input is configured to receive a first electric power from an external power supply. The second power input is configured to receive a second electric power from a secondary battery. The printing engine is configured to perform printing on a medium. The controller is configured to perform selectively executing one of a plurality of different modes. The plurality of different modes includes a first printing mode and a second printing mode. In the first printing mode, the controller controls the printing engine to perform printing using the first electric power without using the second electric power. In the second printing mode, the controller controls the printing engine to perform printing using both the first electric power and the second electric power.

10 Claims, 5 Drawing Sheets

(56) References Cited

FOREIGN PATENT DOCUMENTS

| | | | |
|---|---|---|---|
| JP | 2018-137921 | A | 8/2018 |
| JP | 2022-181798 | A | 12/2022 |

* cited by examiner 1
100
NON-CONTACT POWER TRANSMITTER
8
NON-CONTACT POWER RECEIVER
41
L1
SW1
DRIVE CIRCUIT
12
HEAD
10
L4
SW3
SW2
16
L3
DRIVE CIRCUIT
11
CONVEYANCE MOTOR
9
15
L2
SECONDARY BATTERY
29
ATTACHMENT PORTION
34
VOLTAGE CONVERTER
39
17
SW4

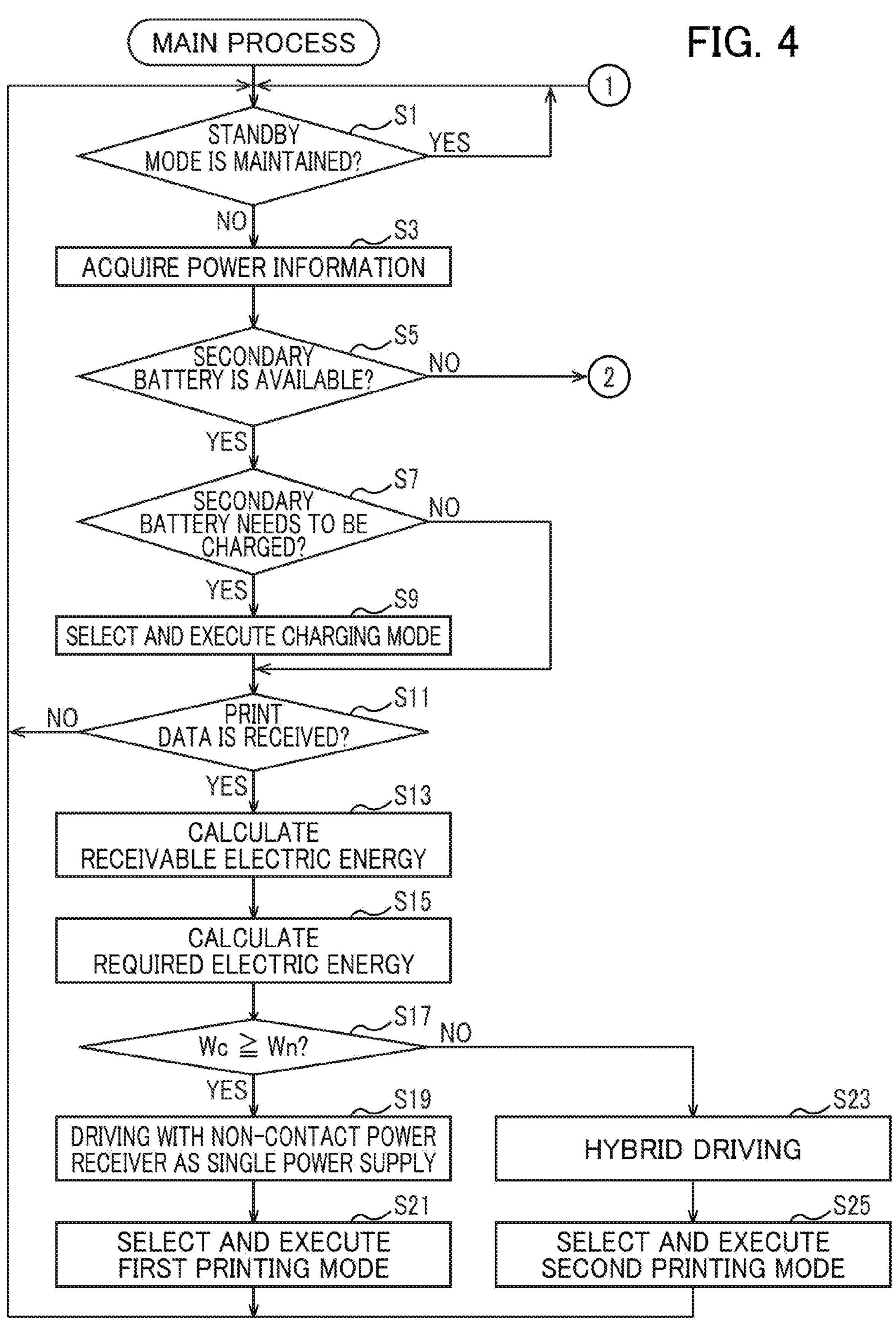
FIG. 4
MAIN PROCESS
S1
STANDBY MODE IS MAINTAINED?
YES
NO
1
S3
ACQUIRE POWER INFORMATION
S5
SECONDARY BATTERY IS AVAILABLE?
NO
2
YES
S7
SECONDARY BATTERY NEEDS TO BE CHARGED?
NO
YES
S9
SELECT AND EXECUTE CHARGING MODE
S11
PRINT DATA IS RECEIVED?
NO
YES
S13
CALCULATE RECEIVABLE ELECTRIC ENERGY
S15
CALCULATE REQUIRED ELECTRIC ENERGY
S17
Wc ≧ Wn?
NO
YES
S19
DRIVING WITH NON-CONTACT POWER RECEIVER AS SINGLE POWER SUPPLY
S23
HYBRID DRIVING
S21
SELECT AND EXECUTE FIRST PRINTING MODE
S25
SELECT AND EXECUTE SECOND PRINTING MODE 2
S27
PRINT DATA IS RECEIVED?
NO
YES
S29
CALCULATE RECEIVABLE ELECTRIC ENERGY
S31
CALCULATE REQUIRED ELECTRIC ENERGY
S33
Wc ≧ Wn?
NO
YES
S35
DRIVING WITH NON-CONTACT POWER RECEIVER AS SINGLE POWER SUPPLY
S39
SELECT AND EXECUTE SUSPENDED MODE
S37
SELECT AND EXECUTE FIRST PRINTING MODE
S41
ISSUE NOTIFICATION
1

PRINTER SELECTIVELY EXECUTING ONE OF PLURALITY OF DIFFERENT MODES INCLUDING FIRST AND SECOND PRINTING MODES

REFERENCE TO RELATED APPLICATIONS

This application claims priority from Japanese Patent Application No. 2023-054477 filed on Mar. 30, 2023. The entire content of the priority application is incorporated herein by reference.

BACKGROUND ART

There has conventionally been known a printing device including a printing unit, a secondary battery, a non-contact power receiver, and a control unit. The printing unit prints information on sheets of paper. The secondary battery supplies a first electric power to the printing unit. The non-contact power receiver receives electric power from an external non-contact power feeder and supplies a second electric power smaller than the first electric power to the printing unit. The control unit supplies the first electric power from the secondary battery to the printing unit when the secondary battery is sufficiently charged and supplies the second electric power from the non-contact power receiver to the printing unit when the secondary battery is insufficiently charged.

SUMMARY

Since the conventional printing device described above is driven primarily by electric power from the secondary battery, there has been a possibility that the secondary battery degrades more quickly due to an increase in the number of times of charging the secondary battery and the like.

In view of the foregoing, it is an object of the present disclosure to provide a printer that can suppress degradation of the secondary battery.

In order to attain the above and other objects, the present disclosure provides a printer including a first power input, a second power input, a printing engine, and a controller. The first power input is configured to receive a first electric power from an external power supply. The second power input is configured to receive a second electric power from a secondary battery. The printing engine is configured to perform printing on a medium using at least one of the first electric power and the second electric power. The controller is configured to perform selectively executing one of a plurality of different modes. The plurality of different modes includes a first printing mode and a second printing mode. In the first printing mode, the controller controls the printing engine to perform printing using the first electric power without using the second electric power. In the second printing mode, the controller controls the printing engine to perform printing using both the first electric power and the second electric power.

In the above structure, when the first electric power provides the printer with sufficient electric energy, the printer executes the first printing mode using the first electric power without using the second electric power. When the electric energy is insufficient with only the first electric power, the printer executes the second printing mode using the second electric power of the secondary battery in addition to the first electric power. In this way, the printer primarily uses the first electric power, and hence, the printer can suppress degradation of the secondary battery.

BRIEF DESCRIPTION OF DRAWINGS

FIG. 4 is a flowchart illustrating steps of a main process.

DESCRIPTION

Below, a printer 1 according to one embodiment of the present disclosure will be described while referring to the accompanying drawings. The printer 1 is configured to print an image on a medium based on print data. The medium is not limited to any specific medium but may be a sheet-like or tape-like medium, for example. In the present embodiment, the medium is a cut thermal paper. The printer 1 can be driven by a plurality of power supplies, including a secondary battery 29 and a non-contact power receiver 41.

Figure 1:
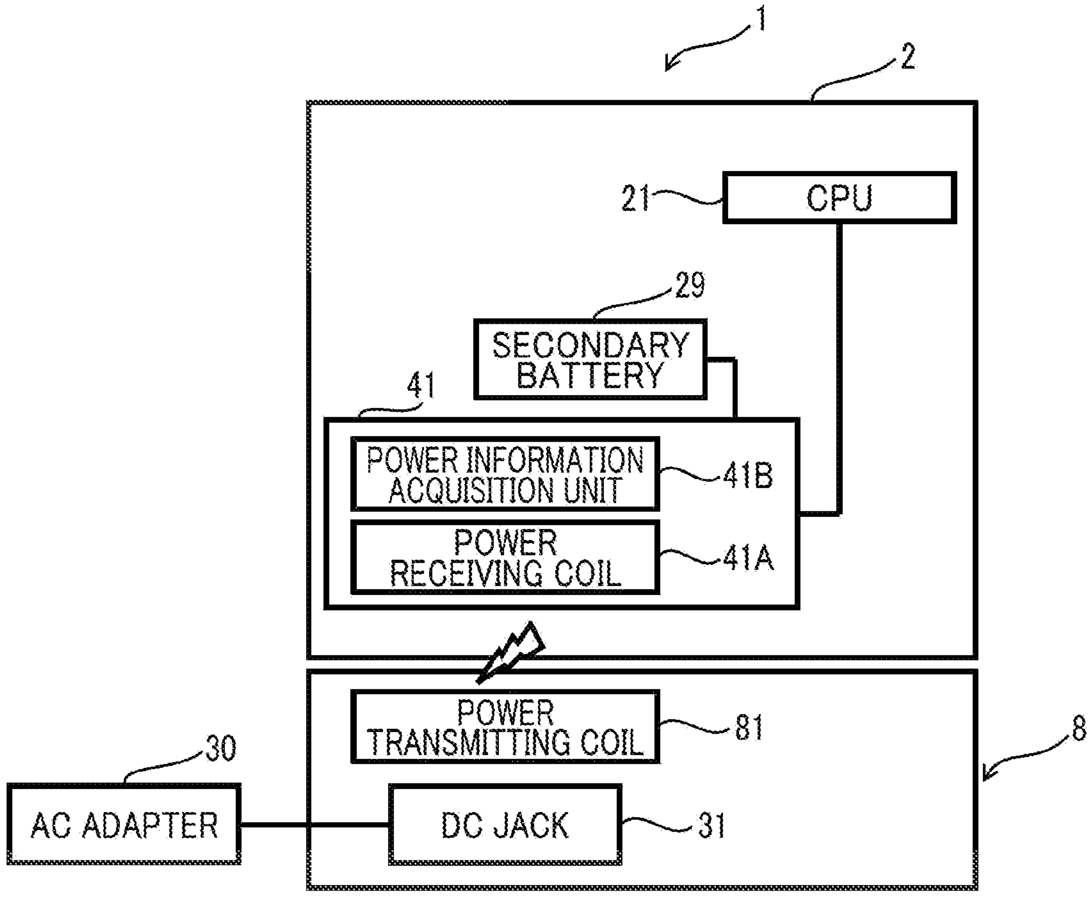
FIG. 1 is a schematic block diagram illustrating the configurations of a printer 1 and a non-contact power transmitter 8.

As shown in FIG. 1, the printer 1 includes a case 2. The case 2 has a rectangular parallelepiped shape, for example. The bottom portion of the case 2 is provided with an attachment portion 34 (see FIG. 3). The secondary battery 29 is attachable to and detachable from the attachment portion 34. The secondary battery 29 can supply a second electric power different from a first electric power described above.

The non-contact power receiver 41 is provided in the bottom end portion of the case 2. The non-contact power receiver 41 includes a power receiving coil 41A, and a power information acquisition unit 41B. The power receiving coil 41A is configured to receive electric power in a contactless manner. That is, the power receiving coil 41A can perform contactless reception of electric power. Hereinafter, electric power received by the power receiving coil 41A will be sometimes called the "first electric power". The power information acquisition unit 41B is configured to acquire power information indicating the electric power that can be supplied based on the received first electric power. The power information is information such as the electric power, voltage, and current that can be outputted from the power receiving coil 41A.

The printer 1 rests on a non-contact power transmitter 8. The non-contact power transmitter 8 includes a DC jack 31, and a power transmitting coil 81. An AC adapter 30 is configured to be connected to the DC jack 31 as an external power supply. In this way, external electric power is supplied to the DC jack 31. With this configuration, a current based on the external electric power flows through the power transmitting coil 81.

When current flows through the power transmitting coil 81, induced electromotive force (i.e., voltage) is generated in the power receiving coil 41A due to electromagnetic induction. Thus, the power receiving coil 41A can supply electric power based on the inputted first electric power (i.e., the received electric power) to the printer 1. For example, the secondary battery 29 is charged with the electric power received by the non-contact power receiver 41.

Figure 2:
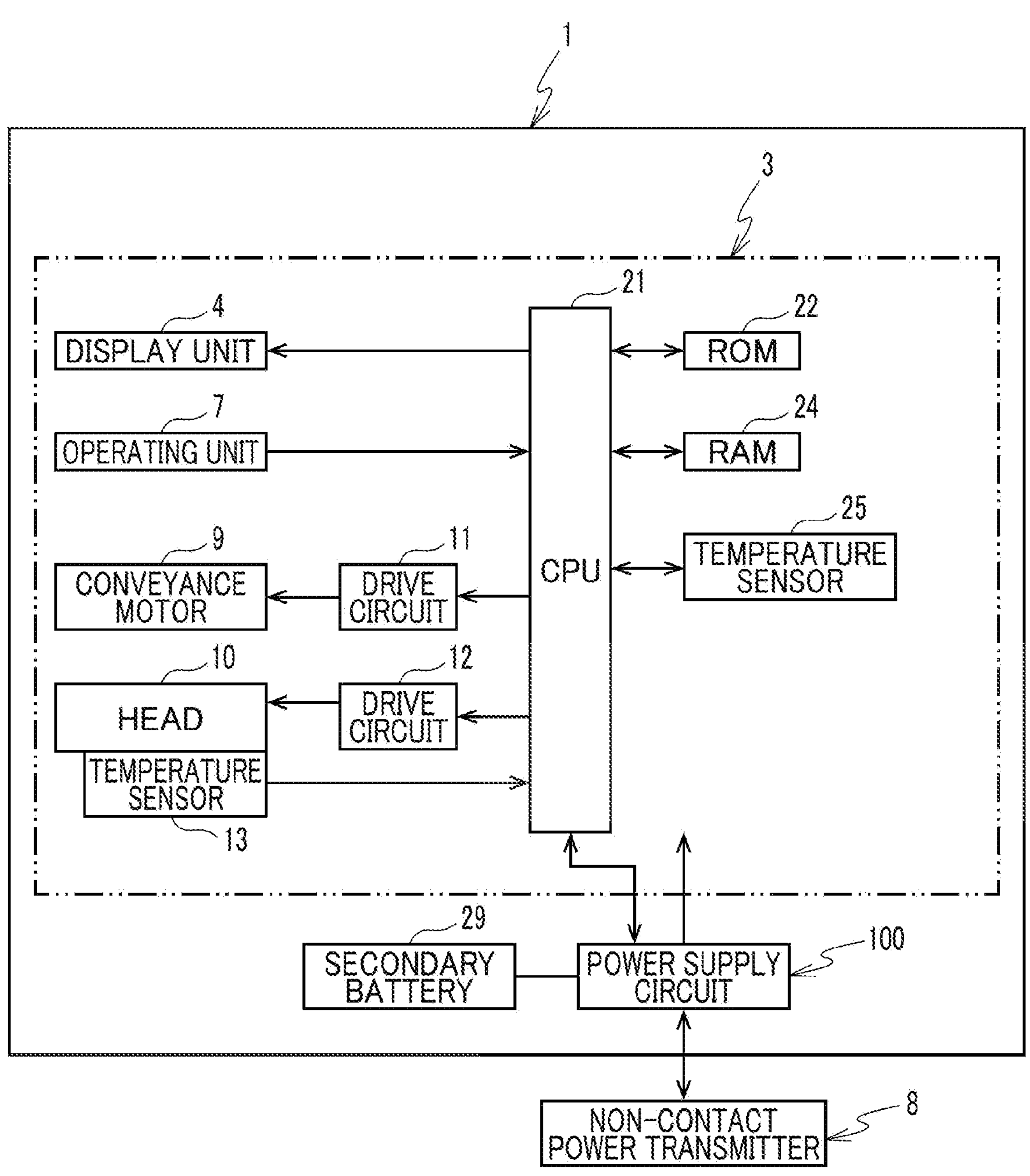
FIG. 2 is a schematic block diagram illustrating the electrical configuration of the printer 1.

Next, the electrical configuration of the printer 1 will be described with reference to FIG. 2. The printer 1 includes a power supply circuit 100, and a printing engine 3. The power supply circuit 100 is configured to supply the first electric power of the non-contact power transmitter 8 (see FIG. 1) and the second electric power of the secondary battery 29 to the printing engine 3. The first electric power is smaller than the second electric power, for example. The received electric power is also smaller than the second electric power. The non-contact power receiver 41 can output a voltage of 9.0 V, for example. The secondary battery 29 can output a voltage of 10.8 V, for example.

The printing engine 3 includes a CPU 21, a ROM 22, a RAM 24, drive circuits 11 and 12, a conveyance motor 9, a thermal head (hereinafter simply called a "head") 10, temperature sensors 13 and 25, a display unit 4, and an operating unit 7.

The ROM 22, RAM 24, display unit 4, operating unit 7, drive circuits 11 and 12, and temperature sensors 13 and 25 are all electrically connected to the CPU 21. The ROM 22 stores various programs required for controlling the printer 1. The CPU 21 performs various computations based on these programs. The RAM 24 includes a storage area. The storage area stores various computational data.

The display unit 4 is provided on the case 2 of the printer 1. The display unit 4 is connected to the CPU 21 and displays various information. The display unit 4 is configured to display various types of information. For example, the display unit 4 is a liquid crystal display, a plurality of LEDs, or the like. The operating unit 7 is provided on the case 2 of the printer 1. The operating unit 7 is connected to the CPU 21 and transmits various instructions to the CPU 21. For example, the operating unit 7 is physical buttons for inputting the various instructions. The operating unit 7 may be any other device as long as instructions can be inputted to the CPU 21 through the operating unit 7. For example, the operating unit 7 may be a dial, a touchscreen, or the like.

The conveyance motor 9 is connected to the drive circuit 11. The conveyance motor 9 is disposed inside the case 2. The conveyance motor 9 generates power for conveying the media. The conveyance motor 9 is driven by the drive circuit 11 to convey the media.

The head 10 is connected to the drive circuit 12. The head 10 is disposed inside the case 2. The head 10 is configured to perform printing on a medium based on print data. The head 10 includes a plurality of heating elements. The head 10 is driven by the drive circuit 12 to selectively heat the heating elements. The CPU 21 executes prints on media by driving the conveyance motor 9 and head 10 with the drive circuit 11 and drive circuit 12, respectively.

The temperature sensor 13 is provided on the head 10. The temperature sensor 13 is configured to detect the temperature of the head 10 and to transmit the detection results to the CPU 21. The temperature sensor 25 is configured to detect ambient temperature around the head 10 and to transmit the detection results to the CPU 21.

Figure 3:
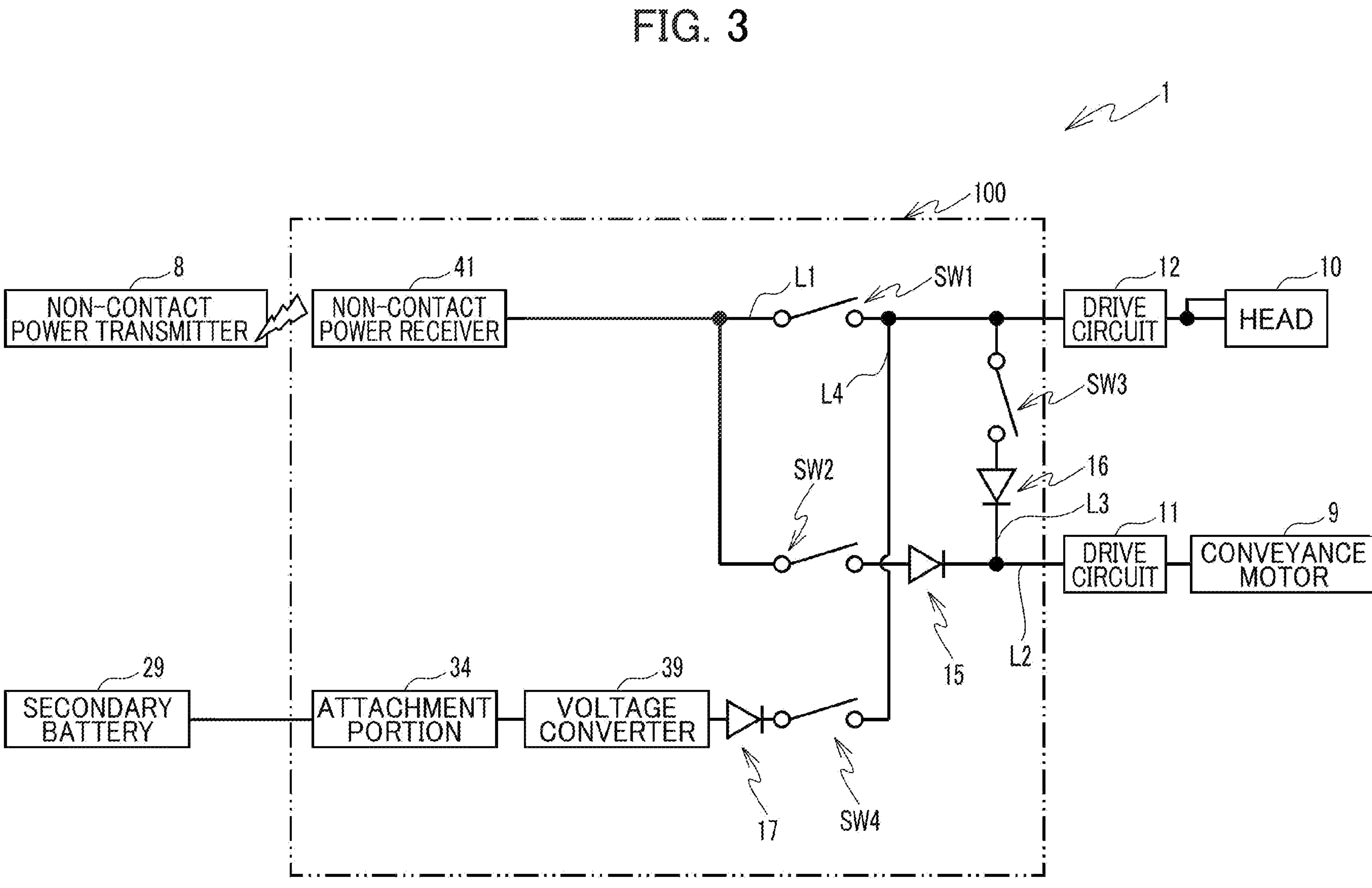
FIG. 3 is a schematic circuit diagram of a power supply circuit 100.

Next, the power supply circuit 100 will be described with reference to FIG. 3. The power supply circuit 100 is configured to supply electric power to the printing engine 3 based on at least one of the first electric power of the non-contact power transmitter 8 and the second electric power of the secondary battery 29. The power supply circuit 100 includes the non-contact power receiver 41, the attachment portion 34, a voltage converter 39, first wiring L1, second wiring L2, third wiring L3, fourth wiring L4, a first switch SW1, a second switch SW2, a third switch SW3, and a fourth switch SW4, and other components.

The non-contact power receiver 41 is electrically connected to the first switch SW1. The first switch SW1 is an on-off switchable electronic device such as a transistor. The first switch SW1 is also electrically connected to the drive circuit 12. The drive circuit 12 is electrically connected to the head 10. Hereinafter, the wiring electrically connecting the non-contact power receiver 41 and the head 10 will be called the "first wiring L1". The first switch SW1 switches the first wiring L1 between a conducting state and a non-conducting state.

The second switch SW2 is electrically connected to a portion of the first wiring L1 between the non-contact power receiver 41 and the first switch SW1. The second switch SW2 is also electrically connected to the anode of a diode 15. The second switch SW2 is an on-off switchable electronic device such as a transistor. The cathode of the diode 15 is electrically connected to the drive circuit 11. The drive circuit 11 is electrically connected to the conveyance motor 9. Hereinafter, the wiring electrically connecting the non-contact power receiver 41 and the conveyance motor 9 will be called the "second wiring L2". The second switch SW2 switches the second wiring L2 between a conducting state and a non-conducting state.

The third switch SW3 is electrically connected to a portion of the first wiring L1 between the first switch SW1 and the drive circuit 12. The third switch SW3 is an on-off switchable electronic device such as a transistor. The third switch SW3 is also electrically connected to the anode of a diode 16. The cathode of the diode 16 is electrically connected to a portion of the second wiring L2 between the cathode of the diode 15 and the drive circuit 11. Hereinafter, the wiring that electrically connects the portion of the first wiring L1 between the first switch SW1 and drive circuit 12 and the portion of the second wiring L2 between the cathode of the diode 15 and the drive circuit 11 will be called the "third wiring L3". The third switch SW3 switches the third wiring L3 between a conducting state and a non-conducting state.

The attachment portion 34 is electrically connected to the voltage converter 39. The voltage converter 39 steps up the voltage of the secondary battery 29 to 15 V. The voltage converter 39 is electrically connected to the anode of a diode 17. The cathode of the diode 17 is electrically connected to the fourth switch SW4. The fourth switch SW4 is an on-off switchable electronic device such as a transistor. The fourth switch SW4 is electrically connected to a portion of the first wiring L1 between the first switch SW1 and the drive circuit 12. Hereinafter, the wiring configured to be electrically connected to the secondary battery 29 and electrically connecting to the portion of the first wiring L1 between the first switch SW1 and drive circuit 12 will be called the "fourth wiring L4".

Next, driving of the printing engine 3 with only the non-contact power receiver 41 as a single power supply will be described. The CPU 21 turns on the first switch SW1 and second switch SW2 and turns off the third switch SW3. As a result, at least a portion of the first electric power of the non-contact power transmitter 8 is supplied to the head 10 via the first wiring L1. Further, at least a portion of the first electric power of the non-contact power transmitter 8 is supplied to the conveyance motor 9 via the second wiring L2. Printing using only the non-contact power receiver 41 as a single power supply of will be sometimes called the "first printing mode". Note that the secondary battery 29 may be attached to the attachment portion 34, but may not be attached to the attachment portion 34. In a case where the secondary battery 29 is attached to the attachment portion

34, the second electric power of the secondary battery 29 is not supplied to the drive circuits 11 and 12 by turning off the fourth switch SW4.

Next, driving of the printing engine 3 with only the secondary battery 29 as a single power supply will be described. The CPU 21 turns on the third switch SW3 and fourth switch SW4 and turns off the first switch SW1 and second switch SW2. As a result, at least a portion of the second electric power of the secondary battery 29 is supplied to the head 10 via the fourth wiring L4 and the first wiring L1. Further, at least a portion of the second electric power of the secondary battery 29 is supplied to the conveyance motor 9 via the fourth wiring L4, the first wiring L1, the third wiring L3, and the second wiring L2. In this case, the non-contact power receiver 41 may or may not be placed on the non-contact power transmitter 8. Even when the non-contact power receiver 41 is placed on the non-contact power transmitter 8, electric power from the non-contact power transmitter 8 is not supplied to the drive circuits 11 and 12 since the first switch SW1 and second switch SW2 are off. Printing using only the secondary battery 29 as a single power supply will be called the "portable printing mode". The portable printing mode is set when the user carries the printer 1 around without putting the printer 1 on the non-contact power transmitter 8.

Next, hybrid driving of the printing engine 3 with the non-contact power receiver 41 and secondary battery 29 will be described. The CPU 21 turns on the second switch SW2 and fourth switch SW4 and turns off the first switch SW1 and third switch SW3. As a result, at least a portion of the first electric power from the non-contact power transmitter 8 is supplied to the conveyance motor 9 via the second wiring L2, but the first electric power from the non-contact power transmitter 8 is not supplied to the head 10. Further, at least a portion of the second electric power from the secondary battery 29 is supplied to the head 10 via the fourth wiring L4 and the first wiring L1, but the second electric power from the secondary battery 29 is not supplied to the conveyance motor 9. Printing through hybrid driving will be sometimes called the "second printing mode".

The following description will assume that the printer 1 has been placed on the non-contact power transmitter 8. Therefore, the portable printing mode in which the printing engine 3 is driven only by the secondary battery 29 is not selected. When the printer 1 is placed on the non-contact power transmitter 8, the secondary battery 29 is charged by the first electric power of the non-contact power transmitter 8 (hereinafter also called the "charging mode"). Further, when the printer 1 is in an idle state waiting to print (hereinafter called the "standby mode"), the electric power needed to maintain this standby mode is used from only the first electric power of the non-contact power transmitter 8. In the standby mode, the first electric power is supplied to a digital circuit system such as the CPU 21, for example. When neither electric power from the non-contact power transmitter 8 nor electric power from the secondary battery 29 is available, printing is not executed (hereinafter also called the "suspended mode").

Figure 5:
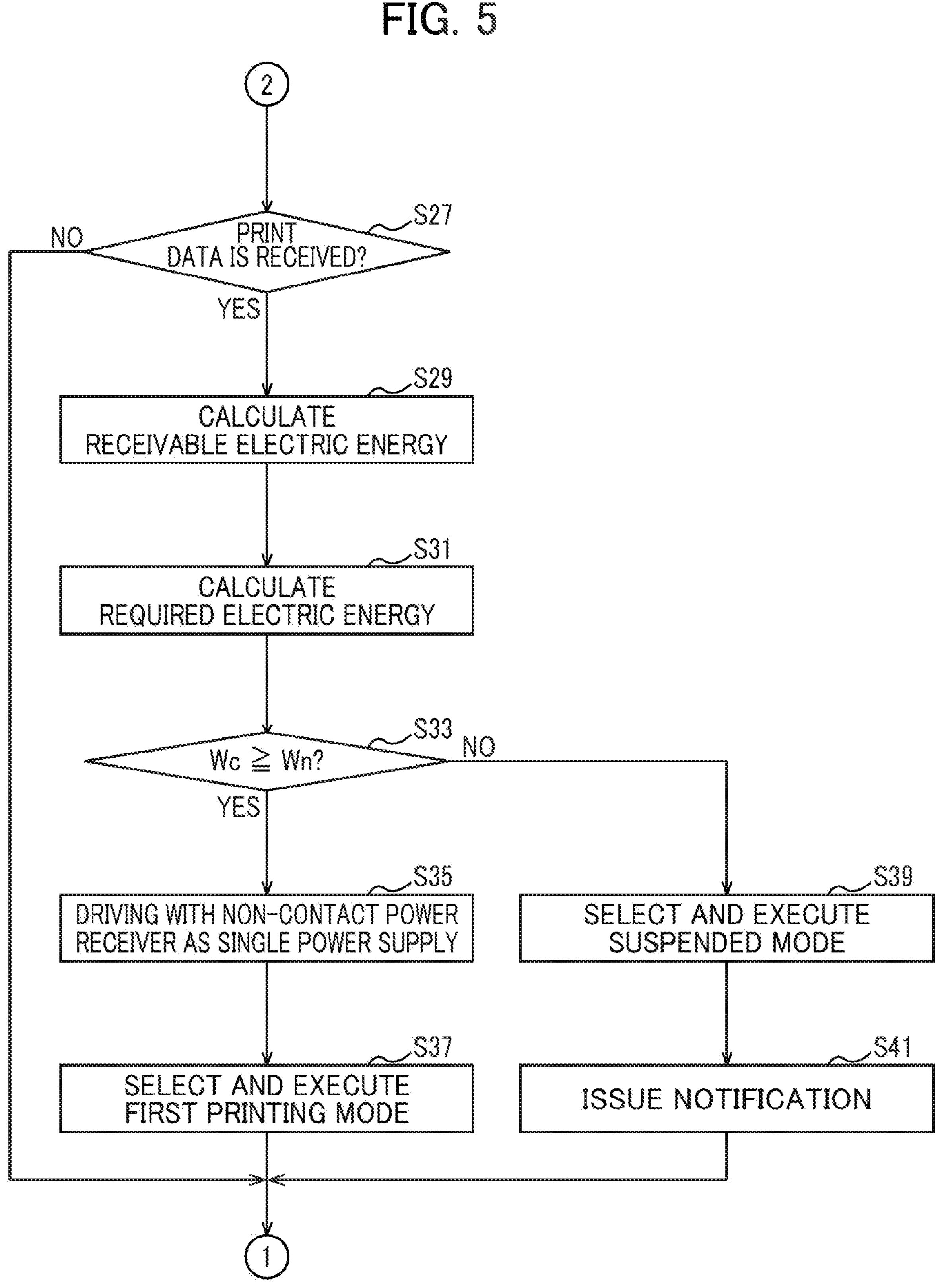
FIG. 5 is a flowchart illustrating subsequent steps of the main process to the steps illustrated in FIG. 4.

Next, a main process performed on the printer 1 will be described with reference to FIGS. 4 and 5. In this example, the user places the printer 1 on the non-contact power transmitter 8 and operates the operating unit 7 to power on the printer 1. When the power to the printer 1 is turned on, the CPU 21 reads a program from the ROM 22 and executes the main process. Note that, immediately after the power to the printer 1 is turned on, the printer 1 is in the standby mode to be driven only by the first electric power from the non-contact power transmitter 8.

In S1 at the beginning of the main process, the CPU 21 determines whether to remain in the standby mode. The CPU 21 determines to remain in the standby mode when the user has not operated the operating unit 7. When determining to remain in the standby mode (S1: YES), the CPU 21 returns to S1 and maintains the standby mode of the printer 1 using only the first electric power from the non-contact power transmitter 8. However, the CPU 21 determines not to remain in the standby mode when the user has performed an operation on the operating unit 7. When determining not to remain in the standby mode (S1: NO), in S3 the CPU 21 acquires power information specifying the electric power that the non-contact power receiver 41 can supply. In this case, the CPU 21 acquires this power information from the power information acquisition unit 41B.

In S5 the CPU 21 determines whether the secondary battery 29 is available. The CPU 21 may determine that the secondary battery 29 is unavailable when the remaining power of the secondary battery 29 is less than a prescribed threshold, such as when the remaining power is lower than 5%. The CPU 21 may also determine that the secondary battery 29 is unavailable when the second electric power, voltage, current, or the like of the secondary battery 29 is lower than the corresponding prescribed threshold or when the secondary battery 29 is not attached to the attachment portion 34.

When the CPU 21 determines that the secondary battery 29 is available (S5: YES), in S7 the CPU 21 determines whether the secondary battery 29 needs to be charged. The CPU 21 determines that charging is needed when the remaining electric power of the secondary battery 29 is not 100%, for example. When the CPU 21 determines that charging of the secondary battery 29 is necessary (S7: YES), in S9 the CPU 21 selects and executes the charging mode. That is, the CPU 21 charges the secondary battery 29 using the first electric power inputted into the non-contact power receiver 41 in a state where the secondary battery 29 is attached to the attachment portion 34. The CPU 21 maintains the charging mode until the remaining electric power of the secondary battery 29 reaches 100%. At this time, the CPU 21 advances to S11. However, when the CPU 21 determines that charging is not necessary (S7: NO), the CPU 21 advances directly to S11 without selecting and executing the charging mode.

In S11 the CPU 21 determines whether print data has been received. When the CPU 21 determines that no print data has been received (S11: NO), the CPU 21 returns to S1 described above. However, when the CPU 21 determines that print data has been received (S11: YES), in S13 the CPU 21 calculates a receivable electric energy Wc on the basis of the power information obtained in S3 and the print data received in S11. The receivable electric energy Wc is the electric energy that the non-contact power receiver 41 can supply based on the first electric power of the non-contact power transmitter 8 for the duration of the printing time required to complete printing on a medium based on the print data received in S11. In other words, the receivable electric energy Wc is the electric energy that can be received based on the first electric power for the printing time. The receivable electric energy Wc is the value obtained by multiplying the printing time by the electric power that the power receiving coil 41A can supply. The printing time may be acquired by referencing past printing history or through a calculation based on the print data.

In S15 the CPU 21 calculates a required electric energy Wn based on the print data received in S11. The required electric energy Wn specifies the electric energy required during the printing time needed to complete printing on the medium based on the print data received in S11. In other words, the required electric energy Wn means the electric energy required to complete printing based on the print data received in S11. For example, the print data includes information indicating the printing pattern and printing width, and the CPU 21 calculates the required electric energy Wn based on the information in the print data specifying the printing pattern and printing width. In this case, the required electric energy Wn is calculated based on the number of on-dots identified from the printing pattern and printing width. If higher accuracy is desired when calculating the required electric energy Wn, the CPU 21 may calculate the required electric energy Wn using additional information, such as using the printing speed of the printing engine 3, the temperature of the head 10, and/or the ambient temperature near the head 10 in addition to the printing pattern and printing width. For example, the CPU 21 sets the printing speed. When the speed is high, the required electric energy Wn increases. When the temperature of the head 10 or ambient temperature around the head 10 is high, the required electric energy Wn decreases since the heating elements of the head 10 heat up more easily.

In S17 the CPU 21 determines whether the receivable electric energy Wc calculated in S13 is greater than or equal to the required electric energy Wn calculated in S15. When the receivable electric energy Wc is greater than or equal to the required electric energy Wn (S17: YES), in S19 the CPU 21 sets the first through fourth switches SW1-SW4 for driving the printing engine 3 with only the non-contact power receiver 41 as a single power supply, as described above. In S21 the CPU 21 selects and executes the first printing mode. In this case, printing on a medium is executed based solely on the first electric power from the non-contact power transmitter 8 and without using the second electric power from the secondary battery 29. Subsequently, the CPU 21 returns to S1 described above.

On the other hand, when the receivable electric energy Wc is less than the required electric energy Wn (S17: NO), in S23 the CPU 21 sets the first through fourth switches SW1-SW4 for hybrid driving of the printing engine 3 with both the non-contact power receiver 41 and the secondary battery 29, as described above. In S25 the CPU 21 selects and executes the second printing mode. In this case, the CPU 21 prints on a medium using the first electric power from the non-contact power transmitter 8 and the second electric power from the secondary battery 29.

On the other hand, when the CPU 21 determines in S5 that the secondary battery 29 is not available (S5: NO), in S27 of FIG. 5 the CPU 21 determines whether print data has been received. When the CPU 21 determines that no print data has been received (S27: NO), the CPU 21 returns to S1 described above.

On the other hand, when the CPU 21 determines that print data has been received (S27: YES), in S29 the CPU 21 calculates the receivable electric energy Wc based on the print data received in S27, similarly to the process of S13. In S31 the CPU 21 calculates the required electric energy Wn based on the print data received in S27, similarly to the process of S15. In S33 the CPU 21 determines whether the receivable electric energy Wc calculated in S29 is greater than or equal to the required electric energy Wn calculated in S31.

When the receivable electric energy Wc is greater than or equal to the required electric energy Wn (S33: YES), in S35 the CPU 21 sets the first through fourth switches SW1-SW4 for driving the printing engine 3 using only the non-contact power receiver 41 as a single power supply, as described above. In S37 the CPU 21 selects and executes the first printing mode. In other words, when the CPU 21 determines that the receivable electric energy Wc is greater than or equal to the required electric energy Wn and that the secondary battery 29 is not available, the CPU 21 executes a print using only the first electric power of the non-contact power transmitter 8. Subsequently, the CPU 21 returns to S1 described above.

When the CPU 21 determines in S33 that the receivable electric energy Wc is less than the required electric energy Wn (S33: NO), in S39 the CPU 21 selects and executes the suspended mode. In other words, when the CPU 21 determines that the receivable electric energy Wc is lower than the required electric energy Wn and that the secondary battery 29 is not available, the CPU 21 does not execute the print. In S41 the CPU 21 notifies the user that printing cannot be executed. The CPU 21 may notify the user by displaying the character string "Printing cannot be performed" or the like on the display of the display unit 4, flashing LEDs to alert the user, or sounding a buzzer warning, for example. This notification makes the user aware that printing is unavailable. The CPU 21 then returns to S1 described above.

As described above, the non-contact power receiver 41 is configured to receive the first electric power from an external power supply (e.g., the non-contact power transmitter 8). The attachment portion 34 is configured to receive the second electric power from the secondary battery 29. The printing engine 3 is configured to perform printing on a medium using at least one of the first electric power and the second electric power. The CPU 21 is configured to control the printing engine 3 to perform printing on a medium. The CPU 21 is configured to selectively execute one of a plurality of different modes. The plurality of different modes includes the first printing mode and the second printing mode. In the first printing mode, the CPU 21 controls the printing engine 3 to perform printing using the first electric power without using the second electric power. In the second printing mode, the CPU 21 controls the printing engine 3 to perform printing using both the first electric power and the second electric power.

When the first electric power provides the printer 1 with sufficient electric energy, the printer 1 executes the first printing mode on the basis of only the first electric power. When the electric energy is insufficient with only the first electric power, the printer 1 executes the second printing mode using the second electric power of the secondary battery 29 in addition to the first electric power. In this way, the printer 1 primarily uses the first electric power, and hence, the printer 1 can suppress degradation of the secondary battery 29.

The CPU 21 selectively executes one of the plurality of different modes including the first printing mode and second printing mode on the basis of the required electric energy Wn based on print data. The required electric energy Wn is an electric energy required to complete printing based on the print data. The printer 1 can select the mode based on the required electric energy Wn for the print data.

The CPU 21 executes the first printing mode when the receivable electric energy Wc, which is the electric energy that can be received based on the first electric power for the printing time identified from the print data, is greater than or equal to the required electric energy Wn. The printing time is a period of time required to complete the printing based on the print data. The CPU 21 executes the second printing mode when the receivable electric energy Wc is less than the required electric energy Wn. Thus, the printer 1 can select the printing mode according to the relationship between the receivable electric energy Wc and the required electric energy Wn.

The required electric energy Wn is calculated based on the printing pattern and printing width included in the print data. With this configuration, the printer 1 can accurately calculate the required electric energy Wn.

The required electric energy Wn is calculated based on the printing speed set by the CPU 21, the temperature of the head 10, and the ambient temperature near the head 10, In addition to the printing pattern and the printing width. In this way, the printer 1 can calculate the required electric energy Wn more accurately.

The CPU 21 executes the first printing mode when printing based on the first electric power is possible and printing based on the second electric power is not (i.e., when printing is possible using the first electric power and the printing is not possible using the second electric power). When printing is not possible based on the first electric power and not possible based on the second electric power (i.e., when printing is not possible either using the first electric power or the second electric power), the CPU 21 selects and executes the suspended mode in which printing is not executed. When the second electric power of the secondary battery 29 is unavailable and the receivable electric energy Wc is sufficient, the printer 1 executes the print using the first electric power. When the secondary battery 29 is unavailable and the receivable electric energy Wc is insufficient, the printer 1 does not execute the print. Therefore, the printer 1 can change the mode according to the situation. This can suppress the printer 1 from attempting a print during a power condition in which printing is not possible. Moreover, the printer 1 can suppress printing failures caused by the receivable electric energy Wc being insufficient.

The CPU 21 selectively executes one of the plurality of different modes including the first printing mode and second printing mode each time the printer 1 receives a print instruction for executing a print. Thus, each time a print instruction is received, the printer 1 can switch the mode to execute the print using suitable power.

The first electric power is inputted from the external power supply into the non-contact power receiver 41 through contactless transfer. In other words, the non-contact power receiver 41 is configured to receive the first electric power from the external power supply in a contactless manner. The printer 1 can print based on the first electric power received in this contactless manner.

The plurality of different mode further includes the standby mode. In other words, the CPU 21 selects and executes the standby mode to maintain the idle state of the printer 1 using the first electric power. The printer 1 can maintain this idle state through the first electric power.

The CPU 21 selects and executes the charging mode to charge the secondary battery 29 using the first electric power. Thus, the printer 1 can charge the secondary battery 29 with the first electric power.

In the above embodiment, the non-contact power receiver 41 is an example of the "first power input" of the present disclosure. The attachment portion 34 is an example of the "second power input" of the present disclosure. The CPU 21 is an example of the "controller" of the present disclosure. The process of S21 executed by the CPU 21 is an example of the "first printing mode" of the present disclosure. The process of S25 executed by the CPU 21 is an example of the "second printing mode" of the present disclosure. The process of S37 executed by the CPU 21 is an example of the "first printing mode" of the present disclosure. The process of S39 executed by the CPU 21 is an example of the "suspended mode" of the present disclosure. The process of S1 executed by the CPU 21 is an example of the "standby mode" of the present disclosure. The process of S9 executed by the CPU 21 is an example of the "charging mode" of the present disclosure.

While the invention has been described in conjunction with the example structure outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Further modifications can be made to the above embodiment in the present disclosure. The technologies disclosed in the above embodiment and the following variations may be combined to the extent that they are not contradictory. The printer 1 described above is not limited to a printer that prints on cut thermal paper. For example, the printer 1 may be a thermal transfer printer or an inkjet printer.

While the printer 1 in the above embodiment is driven by the non-contact power receiver 41 and the secondary battery 29, the printer 1 is not limited to being driven by these two power sources. For example, in place of the non-contact power receiver 41, the printer 1 may be powered by an AC adapter or a USB power supply (conforming to the USB Power Delivery) together with the secondary battery 29. In other words, the printer 1 may be driven by a single power supply such as the AC adapter or the USB power supply or may be driven in a hybrid arrangement by the AC adapter or USB power supply and the secondary battery 29.

When the printer 1 is powered by hybrid driving in the above embodiment, the power received by the non-contact power receiver 41 is supplied to the conveyance motor 9 and the second electric power of the secondary battery 29 is supplied to the head 10, but hybrid driving is not limited to this arrangement. For example, the CPU 21 may supply at least a portion of the power received by the non-contact power receiver 41 to the head 10 and may supply at least a portion of the second electric power of the secondary battery 29 to the conveyance motor 9. Further, when the printer 1 is powered by hybrid driving, the power received by the non-contact power receiver 41 may be used to drive only the head 10 and conveyance motor 9, while the second electric power of the secondary battery 29 may be used to drive other devices. Alternatively, during hybrid driving the second electric power from the secondary battery 29 may be used to drive only the head 10 and conveyance motor 9, while the received power of the non-contact power receiver 41 may be used to drive other devices.

In the above embodiment, the secondary battery 29 is charged with the received power of the non-contact power receiver 41, but the present disclosure is not limited to this configuration. For example, an AC adapter, USB power supply (conforming to the USB Power Delivery), or other power source may be configured to be connected to the printer 1, and the power from this power source may be used to charge the secondary battery 29.

While the first electric power is less than the second electric power in the above embodiment, the present disclosure is not limited to this configuration. For example, the first electric power may be larger than or the same as the second electric power. In such a case, the power supply circuit 100 may determine where to supply the first electric power and second electric power according to the power requirements of the head 10 and the conveyance motor 9. Further, the voltage, current, and power outputted by the non-contact power receiver 41 and secondary battery 29 may be adjusted as needed.

During the standby mode in the above embodiment, the digital circuit system of the CPU 21 is driven by the received power of the non-contact power receiver 41, but the present disclosure is not limited to this. The range of circuits to be driven in the standby mode may be configured as needed. For example, the received power of the non-contact power receiver 41 may be provided to analog circuits as well as digital circuits. The devices to which the received power of the non-contact power receiver 41 is supplied may be set as appropriate.

Note that a microcomputer, application-specific integrated circuit (ASIC), field-programmable gate array (FPGA), or the like may be used as the processor in place of the CPU 21. Processing in the main process may also be distributed among a plurality of processors. The printing engine 3 may include other non-transitory storage media such as a flash memory or hard disk drive. The non-transitory storage media may include any storage medium that can store information regardless of the period of time for which the storage medium can storage the information. The non-transitory storage media need not include a transitory medium (e.g., a transmitted signal).

The various programs may be downloaded (i.e., transmitted as transmission signals) from a server connected to a network (not shown) to be stored in flash memory or on a hard disk drive or the like, for example. In this case, the various programs may be saved in a non-transitory storage medium such as a hard disk drive provided in the server.

What is claimed is:

1. A printer comprising:

a first power input configured to receive a first electric power from an external power supply;

a second power input configured to receive a second electric power from a secondary battery;

a printing engine configured to perform printing on a medium using at least one of the first electric power and the second electric power; and a controller configured to perform:

selectively executing one of a plurality of different modes including:

a first printing mode in which the controller controls the printing engine to perform printing using the first electric power without using the second electric power; and a second printing mode in which the controller controls the printing engine to perform printing using both the first electric power and the second electric power.

2. The printer according to claim 1, wherein, in the selectively executing, the controller selects one of the plurality of different modes on the basis of a required electric energy and executes the selected one of the plurality of different modes, the required electric energy being an electric energy required to complete printing based on print data.

3. The printer according to claim 2, wherein, in the selectively executing, the controller executes:

the first printing mode when a receivable electric energy is greater than or equal to the required electric energy; and the second printing mode when the receivable electric energy is less than the required electric energy, the receivable electric energy being an electric energy that can be received based on the first electric power for a printing time identified from the print data, the printing time being a period of time required to complete the printing based on the print data.

4. The printer according to claim 2, wherein the print data includes information specifying a printing pattern and a printing width, and wherein the required electric energy is calculated based on the printing pattern and the printing width.

5. The printer according to claim 4, wherein the printing engine includes a head, and wherein the required electric energy is calculated based on a printing speed set by the controller, a temperature of the head, and an ambient temperature around the head in addition to the printing pattern and the printing width.

6. The printer according to claim 1, wherein the plurality of different modes further includes a suspended mode in which printing is not performed, and wherein, in the selectively executing, the controller executes:

the first printing mode when printing is possible using the first electric power but the printing is not possible using the second electric power; and the suspended mode when the printing is not possible either using the first electric power or using the second electric power.

7. The printer according to claim 1, wherein the controller performs the selectively executing each time the controller receives a print instruction, the print instruction being an instruction to perform printing.

8. The printer according to claim 1, wherein the first power input is configured to receive the first electric power from the external power supply in a contactless manner.

9. The printer according to claim 1, wherein the plurality of different modes further includes a standby mode to maintain an idle state of the printer using the first electric power.

10. The printer according to claim 1, wherein the controller is further configured to select and execute a charging mode to charge the secondary battery using the first electric power.

* * * * *